(12) United States Patent
Lee et al.

(10) Patent No.: US 8,240,139 B2
(45) Date of Patent: Aug. 14, 2012

(54) METHOD FOR PURIFYING NITROGEN OXIDE IN EXHAUST GAS AND EXHAUST SYSTEM OPERATING THE SAME

(75) Inventors: Jin Ha Lee, Seoul (KR); Jin Woo Park, Suwon (KR); Ilsu Park, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 337 days.

(21) Appl. No.: 12/622,204

(22) Filed: Nov. 19, 2009

(65) Prior Publication Data

US 2011/0023455 A1 Feb. 3, 2011

(30) Foreign Application Priority Data

Jul. 31, 2009 (KR) .................. 10-2009-0070987

(51) Int. Cl.
*F01N 3/00* (2006.01)
(52) U.S. Cl. ............................. 60/301; 60/295
(58) Field of Classification Search .............. 60/274, 60/286, 295, 301
See application file for complete search history.

(56) References Cited

U.S. PATENT DOCUMENTS

| | | | |
|---|---|---|---|
| 2007/0022745 A1* | 2/2007 | Narita et al. | 60/286 |
| 2007/0151232 A1* | 7/2007 | Dalla Betta et al. | 60/286 |
| 2008/0053073 A1* | 3/2008 | Kalyanaraman et al. | 60/286 |
| 2008/0078167 A1* | 4/2008 | Wang et al. | 60/285 |
| 2008/0115485 A1* | 5/2008 | Lee | 60/276 |

FOREIGN PATENT DOCUMENTS

| | | |
|---|---|---|
| JP | 2001-317396 A | 11/2001 |
| KR | 10-0836367 B1 | 6/2008 |

* cited by examiner

*Primary Examiner* — Thomas Denion
*Assistant Examiner* — Patrick Maines
(74) *Attorney, Agent, or Firm* — Morgan, Lewis & Bockius LLP

(57) ABSTRACT

An exhaust system may include an injector mounted at an exhaust pipe or an engine and additionally injecting fuel, a diesel fuel cracking catalyst mounted at the exhaust pipe downstream of the injector and converting additionally injected fuel into a high-reactivity reducing agent through thermal cracking, a DE-NOx catalyst mounted at the exhaust pipe downstream of the diesel fuel cracking catalyst, storing the nitrogen oxide contained in the exhaust gas, and releasing the stored nitrogen oxide by the additionally injected fuel so as to reduce the nitrogen oxide through oxidation-reduction reaction with the high-reactivity reducing agent, and a control portion controlling an additional injection of fuel according to driving condition of the engine, wherein the control portion may control the injector to additionally inject the fuel according to a predetermined injection pattern in a case that driving condition of the engine satisfies an additional injection condition of the fuel and an additional injection timing condition of the fuel.

11 Claims, 6 Drawing Sheets

METHOD FOR PURIFYING NITROGEN OXIDE IN EXHAUST GAS AND EXHAUST SYSTEM OPERATING THE SAME

CROSS-REFERENCE TO RELATED APPLICATION

The present application claims priority of Korean Patent Application Number 10-2009-0070987 filed Jul. 31, 2009, the entire contents of which application is incorporated herein for all purposes by this reference.

BACKGROUND OF THE INVENTION

1. Field of the Invention

The present invention relates to a method for purifying nitrogen oxide in an exhaust gas and an exhaust system operating the same. More particularly, the present invention relates to a method for purifying nitrogen oxide in an exhaust gas and an exhaust system operating the same which improve efficiency of purifying the nitrogen oxide as a consequence that the nitrogen oxide contained in the exhaust gas is stored and the stored nitrogen oxide is then released by fuel additionally injected when a predetermined condition is satisfied such that oxidation-reduction reaction between the stored nitrogen oxide and the additionally injected fuel occurs.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DE-NOx catalyst) is one type of such a catalytic converter and purifies nitrogen oxide contained in the exhaust gas. If reducing agents such as urea, ammonia, carbon monoxide, and hydrocarbon (HC) are supplied to the exhaust gas, the nitrogen oxide contained in the exhaust gas is reduced in the DE-NOx catalyst through oxidation-reduction reaction with the reducing agents.

Recently, a lean NOx trap (LNT) catalyst is used as such a DE-NOx catalyst. The LNT catalyst absorbs the nitrogen oxide contained in the exhaust gas when the engine operates in a lean atmosphere, and releases the absorbed nitrogen oxide when the engine operates in a rich atmosphere.

An exhaust system using such an LNT catalyst controls operating state of the engine (lean or rich) according to nitrogen oxide amount stored in the LNT catalyst. However, in a case that the nitrogen oxide amount is detected and state of air-fuel mixture is controlled, regeneration timing of the LNT catalyst may be delayed. That is, though the control portion judges the regeneration timing, a substantially long time is required for meeting a target air/fuel ratio. Therefore, efficiency of purifying the nitrogen oxide may be deteriorated.

In addition, since regeneration timing of the DE-NOx catalyst is judged based on a signal transmitted from a NOx sensor, there may be a problem of malfunction of the sensor. In addition, expensive sensors may be used.

The above information disclosed in this Background section is only for enhancement of understanding of the background of the invention and therefore it may contain information that does not form the prior art that is already known in this country to a person of ordinary skill in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a method for purifying nitrogen oxide in an exhaust gas and an exhaust system operating the same having advantages of improving efficiency of purifying the nitrogen oxide by judging regeneration timing of a DE-NOx catalyst based only on driving condition of an engine.

Other aspects of the present invention provide for a method for purifying nitrogen oxide in an exhaust gas and an exhaust system operating the same having advantageous of further improving the efficiency of purifying the nitrogen oxide by mounting an injector additionally injecting fuel at an exhaust pipe and activating the additionally injected fuel by using a diesel fuel cracking catalyst.

An exhaust system according to various embodiments of the present invention may include an injector mounted at an exhaust pipe or an engine and additionally injecting fuel, a diesel fuel cracking catalyst mounted at the exhaust pipe downstream of the injector and converting additionally injected fuel into a high-reactivity reducing agent through thermal cracking, a DE-NOx catalyst mounted at the exhaust pipe downstream of the diesel fuel cracking catalyst, storing the nitrogen oxide contained in the exhaust gas, and releasing the stored nitrogen oxide by the additionally injected fuel so as to reduce the nitrogen oxide through oxidation-reduction reaction with the high-reactivity reducing agent, and a control portion controlling an additional injection of fuel according to driving condition of the engine.

The control portion may control the injector to additionally inject the fuel according to a predetermined injection pattern in a case that driving condition of the engine satisfies an additional injection condition of the fuel and an additional injection timing condition of the fuel.

The additional injection condition of the fuel may be satisfied when the engine operates normally and is not an idle state, shift does not occur, a current shift speed is higher than or equal to a first forward speed, an inlet temperature of the DE-NOx catalyst is within a catalyst activation temperature range, an engine rotation speed is within a predetermined rotation speed range, and regeneration does not occur successively.

The additional injection timing condition of the fuel may be satisfied when a slip amount of the nitrogen oxide at a rear portion of the DE-NOx catalyst is larger than or equal to a predetermined slip amount, a nitrogen oxide amount stored in the DE-NOx catalyst is larger than or equal to a predetermined amount, or a ratio of hydrocarbon to the nitrogen oxide is larger than or equal to a predetermined ratio.

The predetermined injection pattern may be changed according to the driving condition of the engine, a state of the engine, or a state of the DE-NOx catalyst.

The control portion may control the injector to stop the additional injection of the fuel in a case that the driving condition of the engine, the state of the engine, or the state of the DE-NOx catalyst is changed during the regeneration of the DE-NOx catalyst.

The exhaust system may further include a particulate filter trapping particulate matters contained in the exhaust gas.

In a case that regeneration condition of the particulate filter is satisfied, the additional injection timing condition of the fuel may be also satisfied.

The regeneration condition of the particulate filter may be satisfied when pressure difference between an inlet and an outlet of the particulate filter is larger than or equal to a predetermined value.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
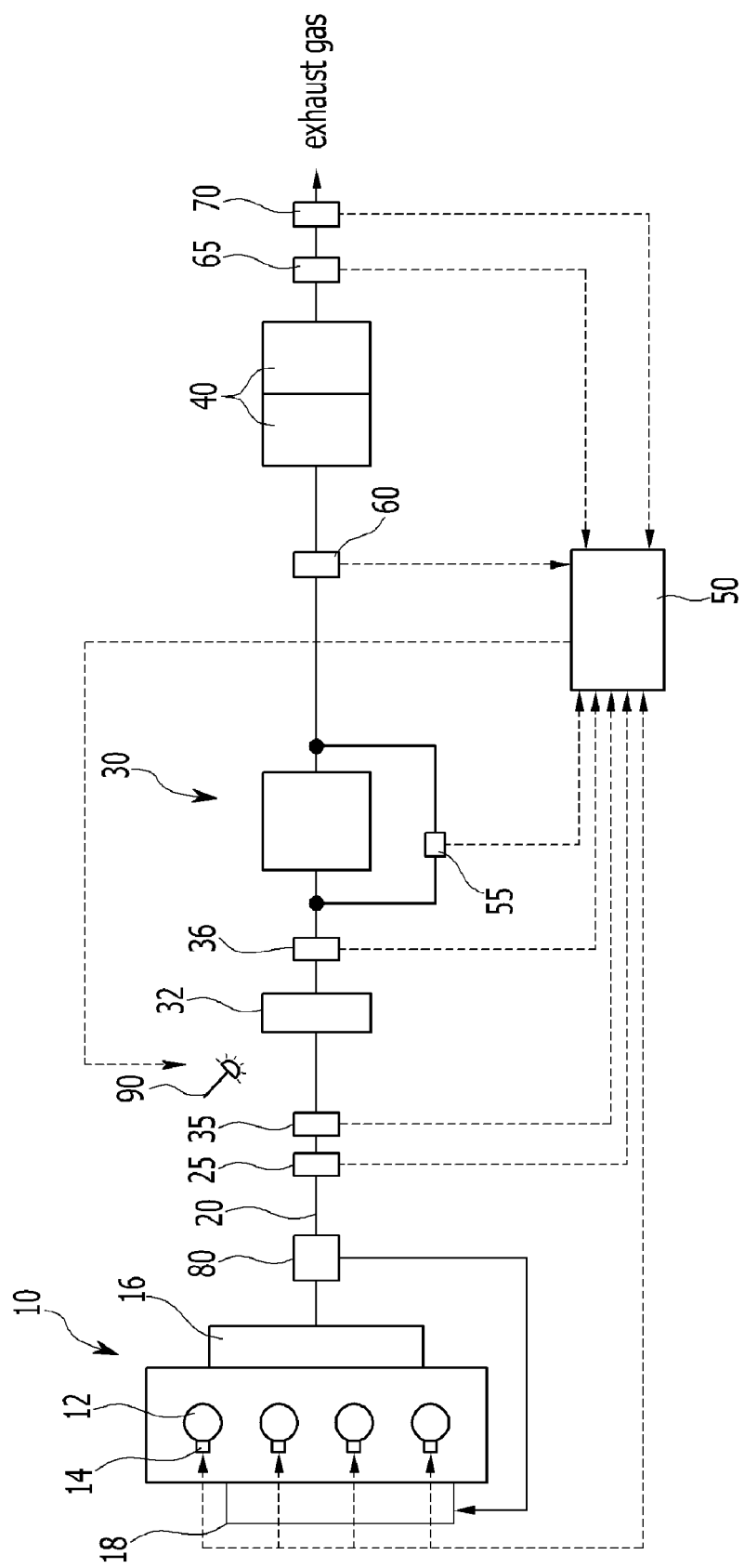
FIG. 1 is a schematic diagram of an exhaust system operating an exemplary method for purifying nitrogen oxide in an exhaust gas according to the present invention.

FIG. 1 is a schematic diagram of an exhaust system operating a method for purifying nitrogen oxide in an exhaust gas according to various embodiments of the present invention.

As shown in FIG. 1, an exhaust system includes an engine 10, an exhaust pipe 20, an exhaust gas recirculation (EGR) apparatus 80, a diesel fuel cracking catalyst 32, a particulate filter 30, a DE-NOx catalyst 40, and a control portion 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a gasoline engine may be used. In a case that the gasoline engine is used, the air-fuel mixture flows into the combustion chamber 12 through the intake manifold 18, and a spark plug (not shown) is mounted at an upper portion of the combustion chamber 12.

In addition, an engine having various compression ratios, preferably a compression ration lower than or equal to 16.5, may be used.

The exhaust pipe 20 is connected to the exhaust manifold 16 so as to exhaust the exhaust gas to the exterior of a vehicle. The particulate filter 30 and the DE-NOx catalyst 40 are mounted at the exhaust pipe 20 so as to remove hydrocarbon, carbon monoxide, and nitrogen oxide contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control portion 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80.

The second injector 90 is mounted at the exhaust pipe 20 downstream of the exhaust gas recirculation apparatus 80, is electrically connected to the control portion 50, and performs additional injection of fuel into the exhaust pipe 20 according to control of the control portion 50.

The particulate filter 30 is mounted at the exhaust pipe 20 downstream of the second injector 90. A diesel fuel cracking catalyst is provided at upstream of the particulate filter 30. In this case, the diesel fuel cracking catalyst 32 is disposed between the second injector 90 and the DE-NOx catalyst 40. Herein, the diesel fuel cracking catalyst 32 is provided separately from the particulate filter 30, but the diesel fuel cracking catalyst 32 may be coated at a front portion of the particulate filter 30.

The diesel fuel cracking catalyst 32 cuts a chain ring of carbon compounds contained in the fuel through catalyst reaction so as to decompose the carbon compounds. That is, the diesel fuel cracking catalyst 32 cuts the chain ring constituting hydrocarbon and decomposes the fuel through thermal cracking Therefore, effective reaction area of the additionally injected fuel increases, and thereby hydrocarbon including high-reactivity oxygen (oxygenated HC), CO, and H2 are produced.

Thermal cracking proceeds as follows.

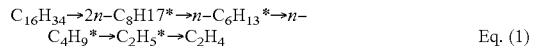

$$C_{16}H_{34} \rightarrow 2n\text{-}C_8H17^* \rightarrow n\text{-}C_6H_{13}^* \rightarrow n\text{-}C_4H_9^* \rightarrow C_2H_5^* \rightarrow C_2H_4 \qquad \text{Eq. (1)}$$

$$C_{16}H_{34} \rightarrow 8C_2H_4 + H_2 \qquad \text{Eq. (2)}$$

Here, * means a radical.

Herein, the hydrocarbon represents all compounds consisting of carbon and hydrogen contained in the exhaust gas and the fuel.

A diesel particulate filter (DPF) 30 which is one type of the particulate filter 30 is mounted at downstream of the diesel fuel cracking catalyst 32, and traps particulate matters (PM) contained in the exhaust gas exhausted through the exhaust pipe 20. In this specification, the particulate filter 30 and the diesel particulate filter 30 are used for representing the same filter. However, other types of particulate filter 30 (e.g., catalyst particulate filter (CPF)) may be used instead of using the diesel particulate filter 30.

In addition, an oxidizing catalyst may be coated at the diesel particulate filter 30. Such an oxidizing catalyst oxidizes hydrocarbon and carbon monoxide contained in the exhaust gas into carbon dioxide, and oxidizes nitrogen monoxide contained in the exhaust gas into nitrogen dioxide. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the diesel fuel cracking catalyst 32, and detects an inlet temperature of the diesel fuel cracking catalyst 32. A second temperature sensor 36 is mounted at downstream of the diesel fuel cracking catalyst 32, and detects an outlet temperature of the diesel fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control portion 50. The control portion 50 controls the particulate filter 30 to be regenerated when the pressure difference detected by the pressure difference sensor 55 is larger than or equal to a predetermined value. In this case, the first injector 14 can post-inject fuel so as to burn soot trapped in the particulate filter 30.

The DE-NOx catalyst 40 is mounted at the exhaust pipe 20 downstream of the particulate filter 30. The DE-NOx catalyst 40 stores the nitrogen oxide contained in the exhaust gas, and releases the stored nitrogen oxide by the additional injection of the fuel. In addition, the DE-NOx catalyst 40 performs a reduction reaction of the released nitrogen oxide so as to purify the nitrogen oxide contained in the exhaust gas.

A third temperature sensor 60 and a fourth temperature sensor 65 are mounted respectively at upstream and downstream of the DE-NOx catalyst 40 so as to detect an inlet temperature and an outlet temperature of the DE-NOx catalyst 40. Herein, the DE-NOx catalyst 40 is divided into two parts. Why the DE-NOx catalyst 40 is divided into two parts is that metal ratio coated at each part may be changed so as to perform a specific function. For example, heat-resisting ability of a first part 40 close to the engine 10 is strengthened by increasing palladium (Pd) ratio, and slip of hydrocarbon at a second part 40 is prevented by increasing platinum (Pt) ratio. On the contrary, the DE-NOx catalyst 40 in which the same metal ratio is coated at an entire region thereof may be used.

In addition, a second oxygen sensor 70 is mounted at the exhaust pipe 20 downstream of the DE-NOx catalyst 40. The second oxygen sensor 70 is used for monitoring whether the exhaust system according to various embodiments of the present invention normally purifies noxious materials contained in the exhaust gas.

The control portion 50 determines a driving condition of the engine based on signals transmitted from each sensor 25, 35, 36, 55, 60, 65, and 70, and controls additional injection amount and additional injection timing of the fuel based on the driving condition of the engine. Thereby, the control portion 50 controls the DE-NOx catalyst 40 to release the stored nitrogen oxide. For example, in a case that nitrogen oxide amount stored in the DE-NOx catalyst 40 is larger than or equal to a predetermined value, the control portion 50 controls the fuel to be additionally injected.

In addition, the control portion 50 controls a ratio of the hydrocarbon to the nitrogen oxide in the exhaust gas to be larger than or equal to a predetermined ratio so as to activate reduction reaction of the nitrogen oxide in the DE-NOx catalyst 40. The predetermined ratio may be 8.

Meanwhile, the control portion 50 calculates the nitrogen oxide amount stored in the DE-NOx catalyst 40, slip amount of the nitrogen oxide at a rear portion of the DE-NOx catalyst, and the ratio of the hydrocarbon to the nitrogen oxide based on the driving condition of the engine. Such calculation is done according to a map table defined by various experiments.

In addition, the control portion 50 changes injection pattern of the fuel by the second injector 90 according to the driving condition of the engine, state of the engine, or state of the DE-NOx catalyst. Here, the state of the engine is assumed by considering operating period of the engine, and the state of the DE-NOx catalyst is assumed by considering degradation of the DE-NOx catalyst.

Meanwhile, the control portion 50 may control the first injector 14 to post-inject the fuel so as to activate the reduction reaction of the nitrogen oxide in the DE-NOx catalyst 40 instead of additional injection of the second injector 90. In this case, the post-injected fuel is converted into high-reactivity reducing agent at the diesel fuel cracking catalyst 32, and promotes the reduction reaction of the nitrogen oxide in the DE-NOx catalyst 40. Therefore, it is to be understood that the additional injection includes the post-injection in this specification and claim sets.

Hereinafter, referring to FIG. 2 to FIG. 4, the DE-NOx catalyst 40 will be further described.

Figure 2:
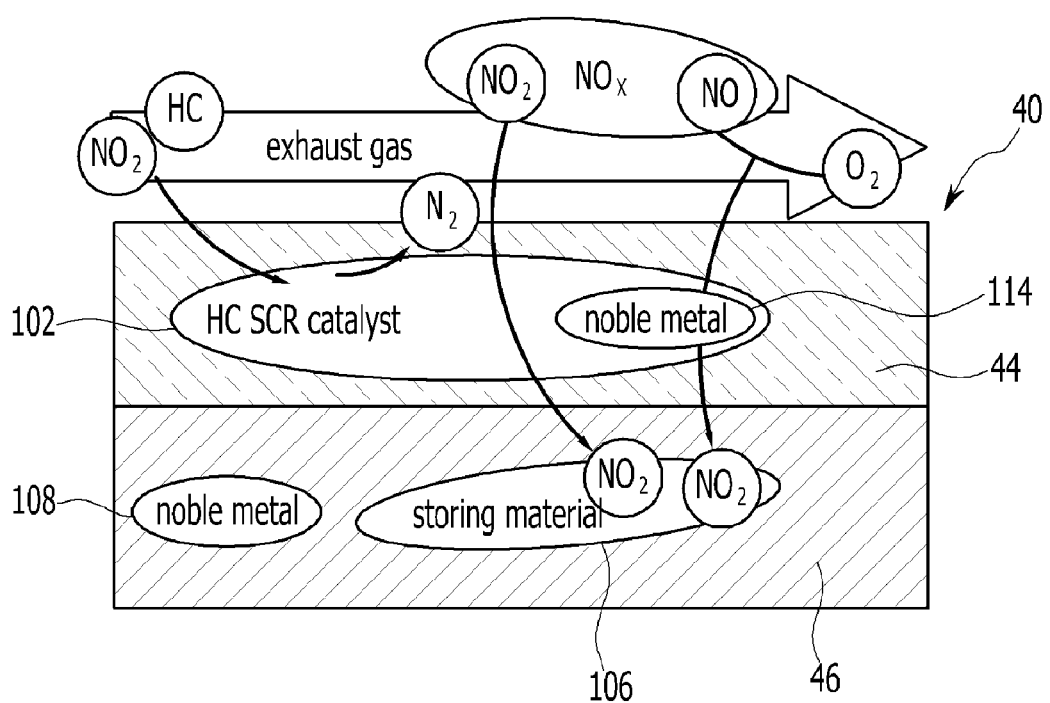
FIG. 2 is a schematic diagram showing that nitrogen oxide is stored in a DE-NOx catalyst used in an exemplary exhaust system according to the present invention.

FIG. 2 is a schematic diagram showing that nitrogen oxide is stored in a DE-NOx catalyst used in an exhaust system according to various embodiments of the present invention; FIG. 3 is a schematic diagram showing that nitrogen oxide is released from a DE-NOx catalyst used in an exhaust system according to various embodiments of the present invention; and FIG. 4 is a schematic diagram showing a structure of a first catalyst layer in a DE-NOx catalyst used in an exhaust system according to various embodiments of the present invention.

Figure 3:
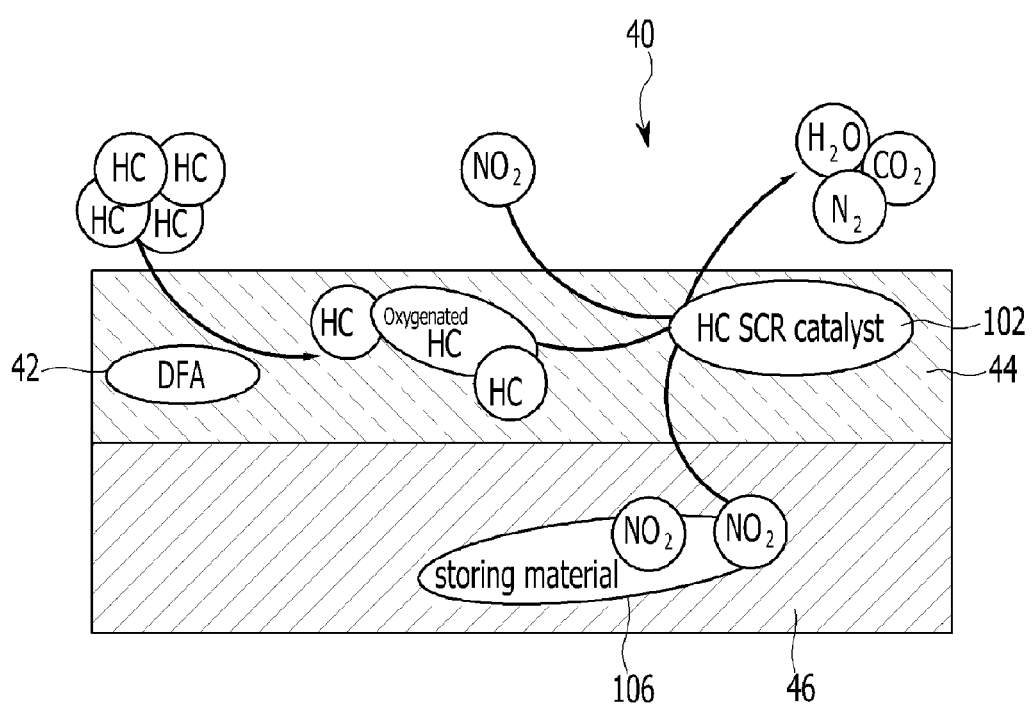
FIG. 3 is a schematic diagram showing that nitrogen oxide is released from a DE-NOx catalyst used in an exemplary exhaust system according to the present invention.
Figure 4:
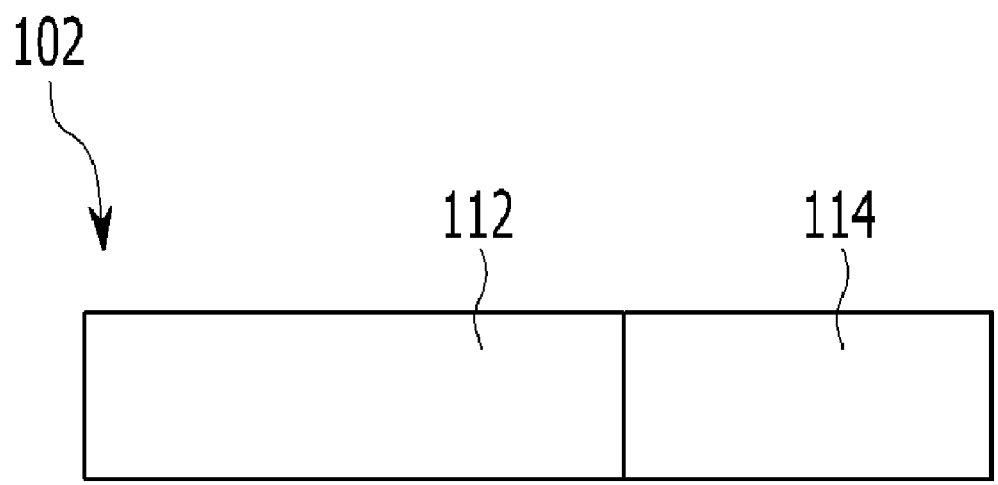
FIG. 4 is a schematic diagram showing a structure of a first catalyst layer in a DE-NOx catalyst used in an exemplary exhaust system according to the present invention.

As shown in FIG. 2 and FIG. 3, the DE-NOx catalyst 40 includes first and second catalyst layers 44 and 46 coated on a carrier. The first catalyst layer 44 is disposed close to the exhaust gas, and the second catalyst layer 46 is disposed close to the carrier.

The first catalyst layer 44 oxidizes the nitrogen oxide contained in the exhaust gas, and reduces a portion of the oxidized nitrogen oxide through oxidation-reduction reaction with the hydrocarbon contained in the unburned fuel or the exhaust gas. In addition, the remaining portion of the oxidized nitrogen oxide is diffused into the second catalyst layer 46. The first catalyst layer 44, as shown in FIG. 4, includes at least one of zeolite catalysts 112 and metal catalysts 114 supported in a porous alumina.

The zeolite catalyst 112 is a catalyst where at least one element among copper, platinum, manganese, iron, cobalt, nickel, zinc, silver, cerium, and gallium is ion-exchanged. Chemical reaction occurring in the zeolite catalyst 112 is as follows.

$$Z\text{—}Cu^{2+}O^- + NO \rightarrow Z\text{—}Cu^{2+}(NO_2^-)_{ads} \rightarrow Z\text{—}CU^{2+} + NO_2 \quad \text{Eq. (3)}$$

$$Z^+O^- + NO \rightarrow Z^+(NO_2^-)_{ads} \rightarrow Z^+ + NO_2 \quad \text{Eq. (4)}$$

$$Z\text{—}Cu^{2+}(NO_2^-)_{ads} + NO \rightarrow Z\text{—}Cu^{2+}N_2O_3^-{}_{ads} \rightarrow Z\text{—}Cu^{2+}O^- + N_2 + O_2 \quad \text{Eq. (5)}$$

$$Z\text{—}H^+ + C_nH_{2n} \rightarrow Z\text{—}C_nH_{2n+1}{}^+ \rightarrow n(Z\text{—}H) + C_nH_{2n}{}^+ \quad \text{Eq. (6)}$$

$$mNO_2 + C_nH_{2n}^+ \rightarrow C_nH_{2n}N_mO_{2m} \rightarrow N_2 + CO_2 + H_2O \quad \text{Eq. (7)}$$

Here, Z means zeolite, and subscript "ads" means adsorption.

In addition, at least one metal element among platinum, palladium, rhodium, iridium, ruthenium, tungsten, chromium, manganese, iron, cobalt, copper, zinc, and silver may be used for the metal catalysts 114 supported in the porous alumina. Chemical reaction occurring in the metal catalyst 114 supported in the porous alumina is as follows.

$$NO+O_2 \rightarrow (NO_x)_{ads} \quad \text{Eq. (8)}$$

$$THC+(NO_x)_{ads} \rightarrow THC\text{—}ONO \text{ or } THC\text{—}NO_2 \quad \text{Eq. (9)}$$

$$THC\text{—}NO_2 \rightarrow THC\text{—}NCO \quad \text{Eq. (10)}$$

$$THC\text{—}NCO+NO+O_2 \rightarrow N_2+CO_2+H_2O \quad \text{Eq. (11)}$$

Herein, THC means hydrocarbon. As described above, the hydrocarbon represents all compounds consisting of carbon and hydrogen contained in the exhaust gas and the fuel.

The second catalyst layer 46 stores the nitrogen oxide diffused from the first catalyst layer 44, and releases the stored nitrogen oxide by the additionally injected fuel such that the stored nitrogen oxide is reduced at the first catalyst layer 44.

The second catalyst layer 46 includes a noble metal 108 and an NOx storing material 106. Barium oxide (BaO) may be used for the NOx storing material 106. The noble metal 108 helps the NOx storing material 106 to store the nitrogen oxide. Various metal materials such as platinum and palladium may be used for the noble metal 108.

Hereinafter, operation of the DE-NOx catalyst will be described in detail.

Nitrogen Oxide Storing Mode

In a case that the fuel is not additionally injected from the second injector 90, the nitrogen oxide contained in the exhaust gas is oxidized in the first catalyst layer 44. A portion of the oxidized nitrogen oxide is reduced into nitrogen gas through the oxidation-reduction reaction with the hydrocarbon contained in the exhaust gas. At this stage, the hydrocarbon contained in the exhaust gas is oxidized into carbon dioxide. Chemical reaction occurring in the first catalyst layer 44 is briefly described as follows.

$$NO+\tfrac{1}{2}O_2 \rightarrow NO_2 \quad \text{Eq. (12)}$$

$$NO+HC \rightarrow \tfrac{1}{2}N_2+CO_2 \quad \text{Eq. (13)}$$

In addition, the remaining portion of the oxidized nitrogen oxide and the nitrogen oxide contained in the exhaust gas are diffused into the second catalyst layer 46. At this time, the noble metal 108 of the second catalyst layer 46 helps the NOx storing material 106 to store the nitrogen oxide. Chemical reaction occurring in the second catalyst layer 46 is briefly described as follows.

$$BaO+2NO_2+\tfrac{1}{2}O_2 \rightarrow Ba(NO_3)_2 \quad \text{Eq. (14)}$$

Nitrogen Oxide Regeneration Mode

In a case that the fuel is additionally injected from the second injector 90, the additionally injected fuel passes through the diesel fuel cracking catalyst 32 and the fuel is converted into the hydrocarbon of a low molecule at this time. In addition, the portion of the hydrocarbon of the low molecular is converted into the oxygenated hydrocarbon and passes through the DE-NOx catalyst 40.

At this time, the nitrogen oxide is released from the second catalyst layer 46 through the substitution reaction with the hydrocarbon, and this will be briefly described as follows.

$$Ba(NO_3)_2+3CO \rightarrow BaCO_3+2NO+2CO_2 \quad \text{Eq. (15)}$$

In addition, the nitrogen oxide is reduced into the nitrogen gas and the hydrocarbon and the oxygenated hydrocarbon are oxidized into the carbon dioxide in the first catalyst layer 44 through the oxidation-reduction reaction of the released nitrogen oxide with the hydrocarbon and the oxygenated hydrocarbon. This will be briefly described as follows.

$$NO+HC/\text{Oxygenated } HC=\tfrac{1}{2}N_2+CO_2 \quad \text{Eq. (16)}$$

Therefore, the nitrogen oxide and the hydrocarbon contained in the exhaust gas are purified.

Figure 5:
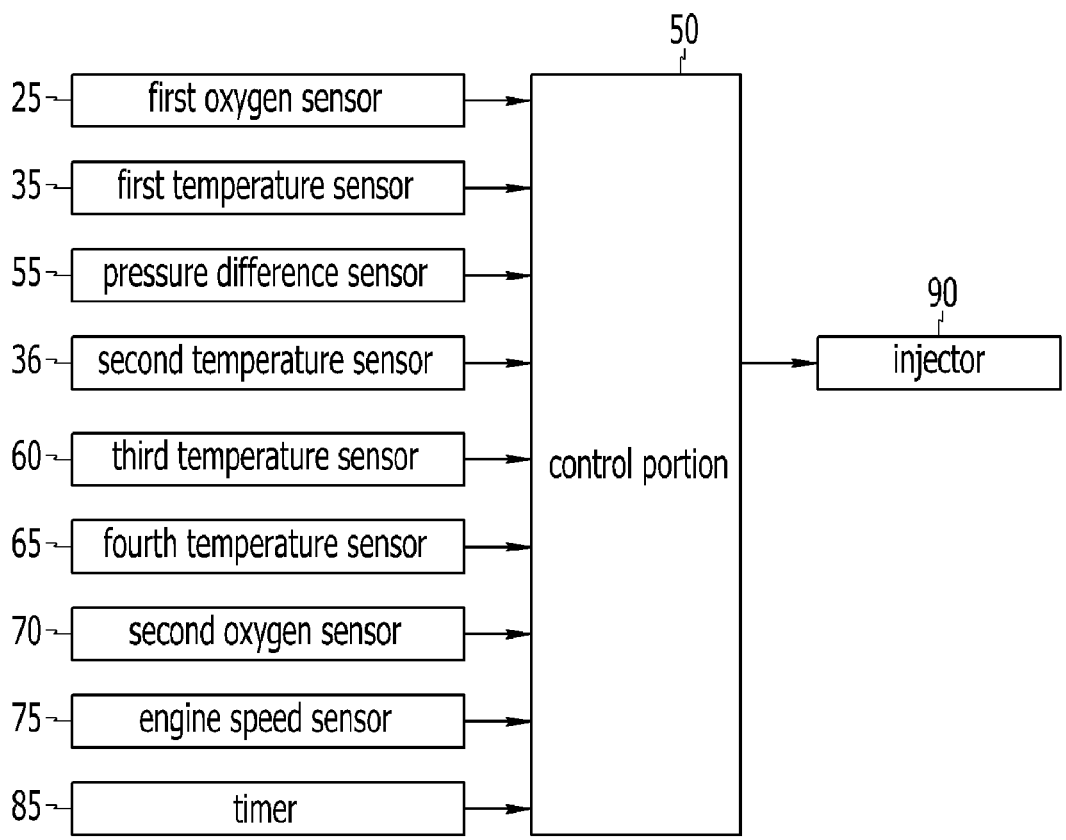
FIG. 5 is a block diagram showing a relationship of an input and an output of a control portion used in an exemplary exhaust system according to the present invention.

FIG. 5 is a block diagram showing a relationship of an input and an output of a control portion used in an exhaust system according to various embodiments of the present invention.

As shown in FIG. 5, detected values by the first and second oxygen sensors 25 and 70, the first, second, third, and fourth temperature sensors 35, 36, 60, and 65, an engine speed sensor 75, and a timer 85 are transmitted to the control portion 50.

The control portion 50 determines the driving condition of the engine, the additional injection amount and the additional injection timing of the fuel, and the additional injection pattern based on the detected values, and outputs a signal for controlling the second injector 90 to the second injector 90.

The engine speed sensor 75 detects rotation speed of the engine and transmits a signal corresponding thereto to the control portion 50.

The timer 85 is turned on when the regeneration of the DE-NOx catalyst is completed or when the driving condition of the engine is changed and the additional injection of the fuel is stopped during the regeneration of the DE-NOx catalyst. On the contrary, when the additional injection of the fuel is begun in a turned-on state of the timer 85, the timer 85 is reset.

Meanwhile, the exhaust system according to various embodiments of the present invention includes a plurality of sensors except the sensors shown in FIG. 5, but description therefore will be omitted for better comprehension and ease of description.

Hereinafter, a method for purifying nitrogen oxide in an exhaust gas according to various embodiments of the present invention will be described in detail.

Figure 6:
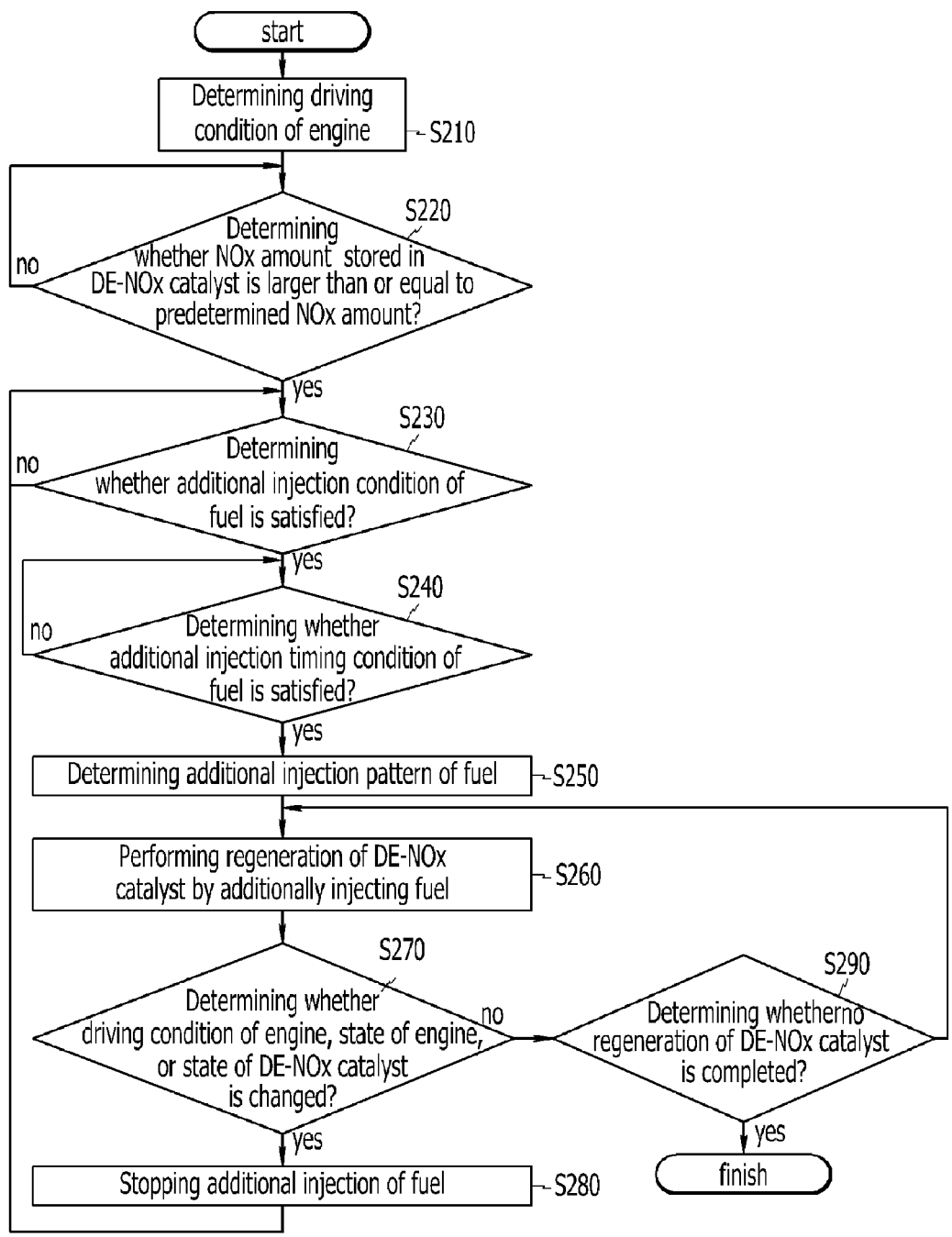
FIG. 6 is a flowchart operating a method for purifying nitrogen oxide in an exemplary exhaust gas according to the present invention.

FIG. 6 is a flowchart operating a method for purifying nitrogen oxide in an exhaust gas according to various embodiments of the present invention.

As shown in FIG. 6, while the engine is operated, the control portion 50 determines the driving condition of the engine based on the detected values by the sensors 25, 35, 36, 55, 60, 65, 70, and 75 at a step S210.

The control portion 50 calculates generation amount of the nitrogen oxide based on the driving condition of the engine, and determines based on the generation amount of the nitrogen oxide whether the nitrogen oxide amount stored in the DE-NOx catalyst 40 is larger than or equal to the predetermined nitrogen oxide amount at a step S220.

If the stored amount of the nitrogen oxide is smaller than the predetermined nitrogen oxide amount at the step S220, the control portion 50 continues to calculate the stored amount of the nitrogen oxide based on the driving condition of the engine.

If the stored amount of the nitrogen oxide is larger than or equal to the predetermined nitrogen oxide amount at the step S220, the control portion 50 determines whether an additional injection condition of the fuel is satisfied at a step S230. The additional injection condition of the fuel may be satisfied when the engine operates normally and is not an idle state, shift does not occur, a current shift speed is higher than or equal to a first forward speed, the inlet temperature of the DE-NOx catalyst is within a catalyst activation temperature range (e.g., 200° C.-600° C.), the engine rotation speed is within a predetermined rotation speed range, and regeneration does not occur successively. In order to determine whether the engine operates normally, a fuel temperature, an intake air temperature, an atmospheric pressure, a coolant temperature, and the fuel injection amount are additionally detected. In addition, in a case that the temperature in the DE-NOx catalyst is too high or low, the reduction reaction of the nitrogen oxide does not occur normally. Therefore, if the inlet temperature of the DE-NOx catalyst is too high or low, the regeneration of the DE-NOx catalyst 40 is prohibited. In addition, the regeneration of the DE-NOx catalyst 40 is also prohibited, when the regeneration of the DE-NOx catalyst 40 is just finished or when a predetermined time is not passed after the regeneration of the DE-NOx catalyst 40 is finished. That is, the successive regeneration of the DE-NOx catalyst 40 is prohibited.

If the additional injection condition of the fuel is not satisfied at the step S230, the control portion 50 continues to determine whether the additional injection condition of the fuel is satisfied at the step S230.

If the additional injection condition of the fuel is satisfied at the step S230, the control portion 50 determines whether the additional injection timing condition of the fuel is satisfied at a step S240. That is, since the addition injection of the fuel is readied at the step S230, the fuel is additionally injected if the additional injection timing condition of the fuel is satisfied. The additional injection timing condition of the fuel may be satisfied when a slip amount of the nitrogen oxide at the rear portion of the DE-NOx catalyst 40 is larger than or equal to a predetermined slip amount, the nitrogen oxide amount stored in the DE-NOx catalyst 40 is larger than or equal to a predetermined amount (the predetermined amount at this step may be larger than that at the step S220), or a ratio of the hydrocarbon to the nitrogen oxide is larger than or equal to a predetermined ratio. The predetermined slip amount, the predetermined amount, and the predetermined ratio can be set according to the state of the engine 10 and the state of the DE-NOx catalyst 40 by a person of an ordinary skill in the art.

If the additional injection timing condition of the fuel is not satisfied at the step S240, the control portion 50 continues to determine whether the additional injection timing condition of the fuel is satisfied at the step S240.

If the additional injection timing condition of the fuel is satisfied at the step S240, the control portion 50 determines the additional injection pattern of the fuel at a step S250. As described above, the control portion 50 controls the second injector 90 to change the additional injection pattern of the fuel according to the driving condition of the engine, the state of the engine, or the state of the DE-NOx catalyst. The additional injection pattern of the fuel is determined mainly by the number of injection times and an injection period (i.e., pulse width of close/open signal of a valve input to the second injector 90). Therefore, the control portion 50 determines an optimal number of injection times and an optimal injection period according to the driving condition of the engine, the state of the engine, or the state of the DE-NOx catalyst.

After that, the control portion 50 controls the second injector 90 to additionally inject the fuel according to the determined additional injection pattern of the fuel, and the DE-NOx catalyst 40 is regenerated as a consequence that the second injector 90 additionally injects the fuel at a step S260. The regeneration of the DE-NOx catalyst 40 means that the nitrogen oxide stored in the DE-NOx catalyst 40 is released.

During the DE-NOx catalyst 40 is regenerated, the control portion 50 determines whether the driving condition of the engine, the state of the engine, or the state of the DE-NOx catalyst 40 is changed at a step S270. Change of the driving condition of the engine, the state of the engine, or the state of the DE-NOx catalyst means that the regeneration of the DE-NOx catalyst 40 should be prohibited. The change of the driving condition of the engine, the state of the engine, or the state of the DE-NOx catalyst is such that a shift signal is detected, the engine rotation speed becomes out of the predetermined speed range, or the inlet temperature of the DE-NOx catalyst 40 becomes out of the catalyst activation temperature range. In addition, all states at which a person of an ordinary skill in the art determines that the regeneration of the DE-NOx catalyst 40 should be prohibited is included in the change of the driving condition of the engine, the state of the engine, or the state of the DE-NOx catalyst.

If the driving condition of the engine, the state of the engine, or the state of the DE-NOx catalyst does not change at the step S270, the control portion 50 determines whether the regeneration of the DE-NOx catalyst 40 is completed at a step S290. If the driving condition of the engine, the state of the engine, or the state of the DE-NOx catalyst changes at the step S270, the control portion 50 controls the second injector 90 to stop the additional injection of the fuel at a step S280, and the method is returned to the step S230.

If the regeneration of the DE-NOx catalyst 40 is not completed, the method is returned to the step S260. If the regeneration of the DE-NOx catalyst 40, on the contrary, is completed, the method for purifying nitrogen oxide in an exhaust gas according to various embodiments of the present invention is finished.

According to the present invention, efficiency of purifying nitrogen oxide contained in an exhaust gas may be improved by precisely controlling additionally injected fuel amount according to driving condition of an engine.

In addition, since additionally injected fuel is activated by a diesel fuel cracking catalyst, oxidation-reduction reaction occurring in a DE-NOx catalyst is also activated. Therefore, the efficiency of purifying the nitrogen oxide contained in the exhaust gas may further be improved.

For convenience in explanation and accurate definition in the appended claims, the terms "upper", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for purifying nitrogen oxide which purifies nitrogen oxide contained in an exhaust gas, the method comprising:
providing an exhaust system mounted at an exhaust pipe, wherein the exhaust system comprises:
an injector mounted at the exhaust pipe or an engine and additionally injecting fuel;
a diesel fuel cracking catalyst mounted at the exhaust pipe downstream of the injector and converting additionally injected fuel into a high-reactivity reducing agent through thermal cracking;

a DE-NOx catalyst mounted at the exhaust pipe downstream of the diesel fuel cracking catalyst, storing the nitrogen oxide contained in the exhaust gas, and releasing the stored nitrogen oxide by the additionally injected fuel so as to reduce the nitrogen oxide through oxidation-reduction reaction with the high-reactivity reducing agent; and a control portion controlling an additional injection of fuel according to driving condition of the engine; and regenerating the DE-NOx catalyst by additionally injecting the fuel according to a predetermined injection pattern in a case that the driving condition of the engine satisfies an additional injection condition of the fuel and an additional injection timing condition of the fuel;

wherein the additional injection condition of the fuel is satisfied when the engine operates normally and is not an idle state, shift does not occur, a current shift speed is higher than or equal to a first forward speed, an inlet temperature of the DE-NOx catalyst is within a catalyst activation temperature range, an engine rotation speed is within a predetermined rotation speed range, and regeneration does not occur successively.

2. The method of claim 1, wherein the additional injection timing condition of the fuel is satisfied when a slip amount of the nitrogen oxide at a rear portion of the DE-NOx catalyst is larger than or equal to a predetermined slip amount, a nitrogen oxide amount stored in the DE-NOx catalyst is larger than or equal to a predetermined amount, or a ratio of hydrocarbon to the nitrogen oxide is larger than or equal to a predetermined ratio.

3. The method of claim 1, wherein the predetermined injection pattern is changed according to the driving condition of the engine, a state of the engine, or a state of the DE-NOx catalyst.

4. The method of claim 1, wherein the additional injection of the fuel is stopped in a case that the driving condition of the engine, the state of the engine, or the state of the DE-NOx catalyst is changed during the regeneration of the DE-NOx catalyst.

5. The method of claim 1, wherein the exhaust system further comprises a particulate filter trapping particulate matters contained in the exhaust gas, and wherein, in a case that regeneration condition of the particulate filter is satisfied, the additional injection timing condition of the fuel is also satisfied.

6. An exhaust system which is mounted at an exhaust pipe and purifies nitrogen oxide contained in an exhaust gas, the exhaust system comprising:

an injector mounted at the exhaust pipe and additionally injecting fuel;

a diesel fuel cracking catalyst mounted at the exhaust pipe downstream of the injector and converting the additionally injected fuel into a high-reactivity reducing agent through thermal cracking;

a DE-NOx catalyst mounted at the exhaust pipe downstream of the diesel fuel cracking catalyst, temporarily storing the nitrogen oxide contained in the exhaust gas, and releasing the stored nitrogen oxide by the additionally injected fuel so as to reduce the nitrogen oxide through oxidation-reduction reaction with the high-reactivity reducing agent; and a control portion controlling the injector to additionally inject the fuel according to a predetermined injection pattern in a case that driving condition of the engine satisfies an additional injection condition of the fuel and an additional injection timing condition of the fuel;

wherein the additional injection condition of the fuel is satisfied when the engine operates normally and is not an idle state, shift does not occur, a current shift speed is higher than a first forward speed, an inlet temperature of the DE-NOx catalyst is within a catalyst activation temperature range, an engine rotation speed is within a predetermined rotation speed range, and regeneration does not occur successively.

7. The exhaust system of claim 6, wherein the additional injection timing condition of the fuel is satisfied when a slip amount of the nitrogen oxide at a rear portion of the DE-NOx catalyst is larger than or equal to a predetermined slip amount, a nitrogen oxide amount stored in the DE-NOx catalyst is larger than or equal to a predetermined amount, or a ratio of hydrocarbon to the nitrogen oxide is larger than or equal to a predetermined ratio.

8. The exhaust system of claim 6, wherein the predetermined injection pattern is changed according to the driving condition of the engine, a state of the engine, or a state of the DE-NOx catalyst.

9. The exhaust system of claim 6, wherein the additional injection of the fuel is stopped in a case that the driving condition of the engine, the state of the engine, or the state of the DE-NOx catalyst is changed during the regeneration of the DE-NOx catalyst.

10. The exhaust system of claim 6, further comprising a particulate filter trapping particulate matters contained in the exhaust gas, wherein, in a case that regeneration condition of the particulate filter is satisfied, the additional injection timing condition of the fuel is also satisfied.

11. The exhaust system of claim 10, wherein the regeneration condition of the particulate filter is satisfied when pressure difference between an inlet and an outlet of the particulate filter is larger than or equal to a predetermined value.

* * * * *